Nov. 28, 1944.  W. R. ROYER  2,363,998
TIRE CHAIN CONNECTOR
Filed Jan. 30, 1942  4 Sheets-Sheet 2
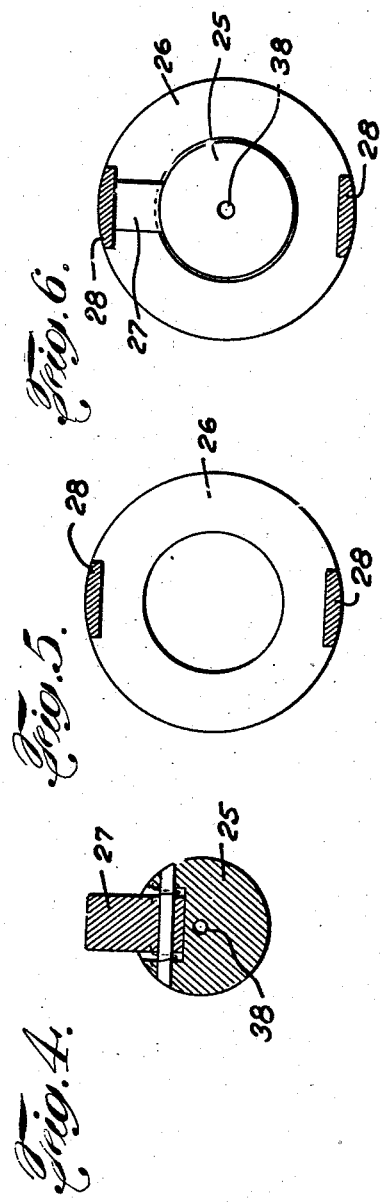
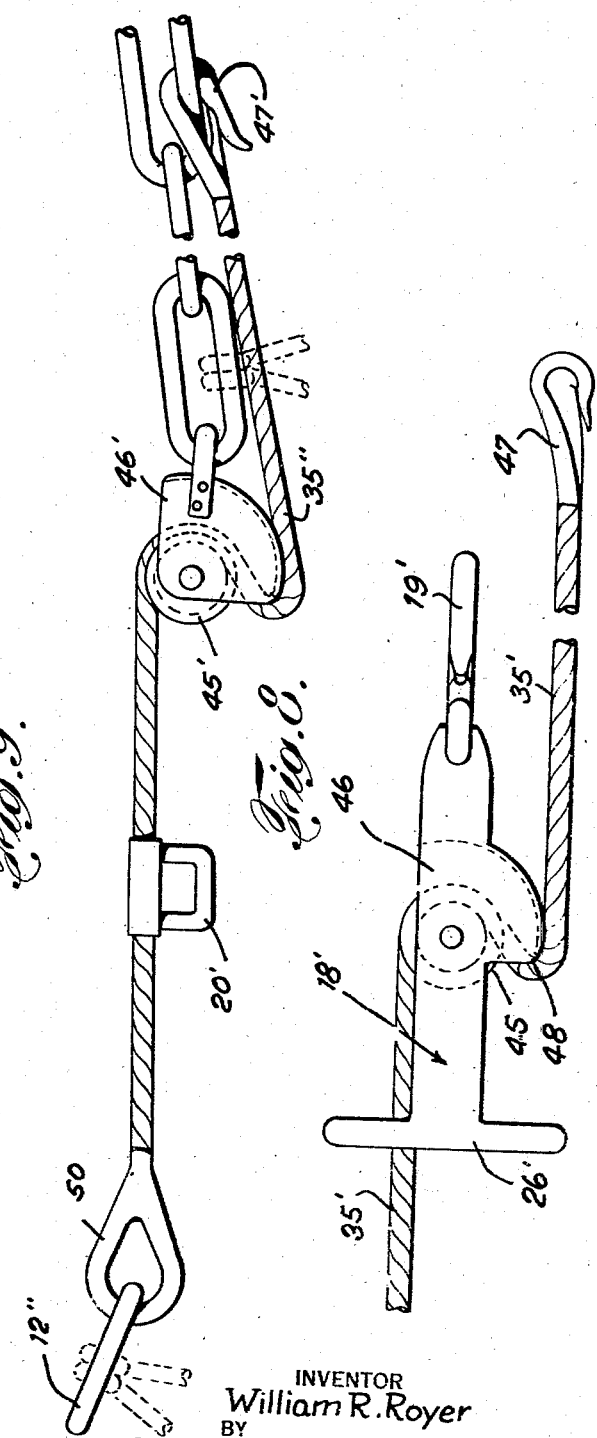
INVENTOR
William R. Royer
BY
Emery, Varney, Whittemore & Dix
ATTORNEYS

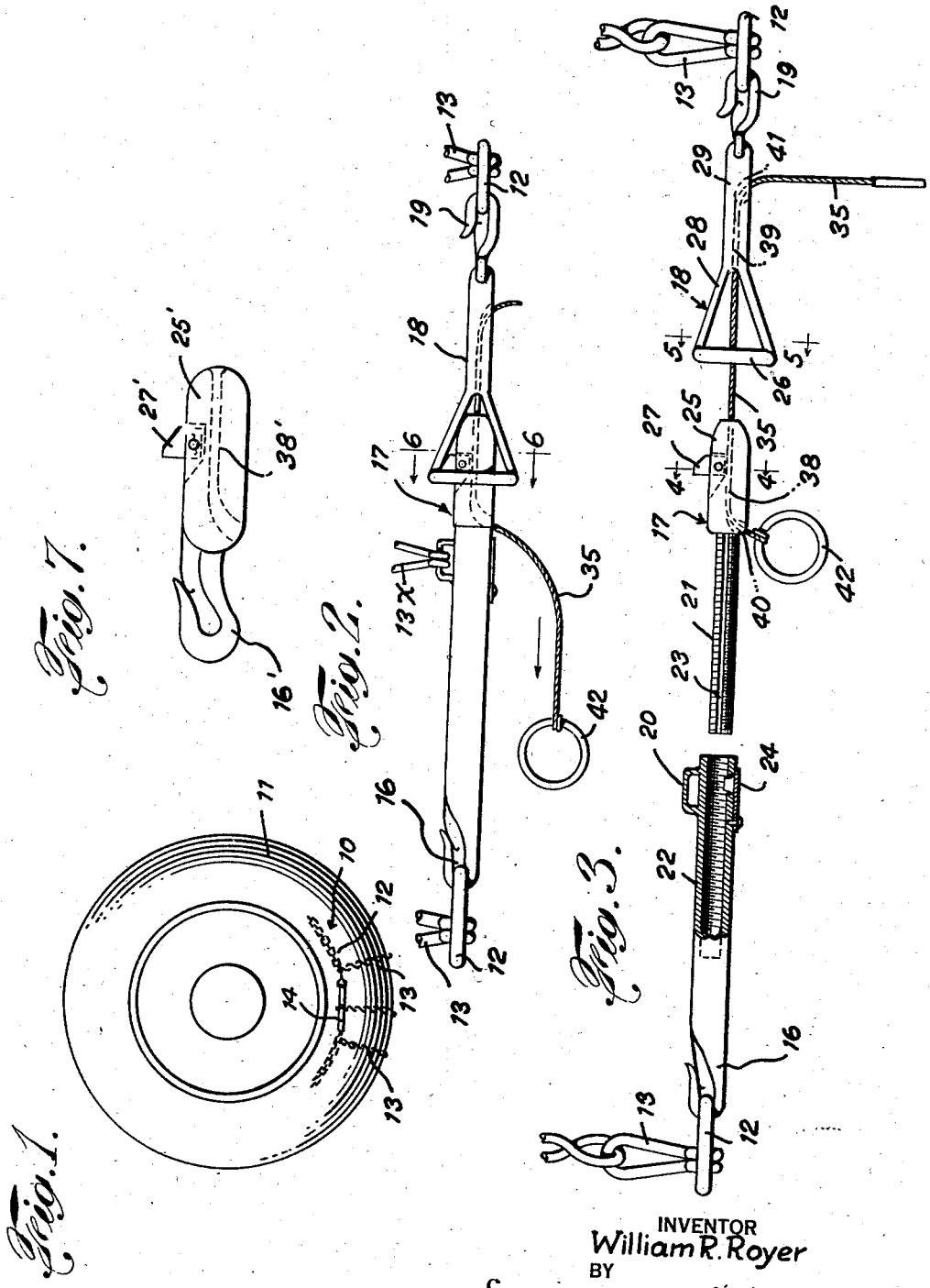

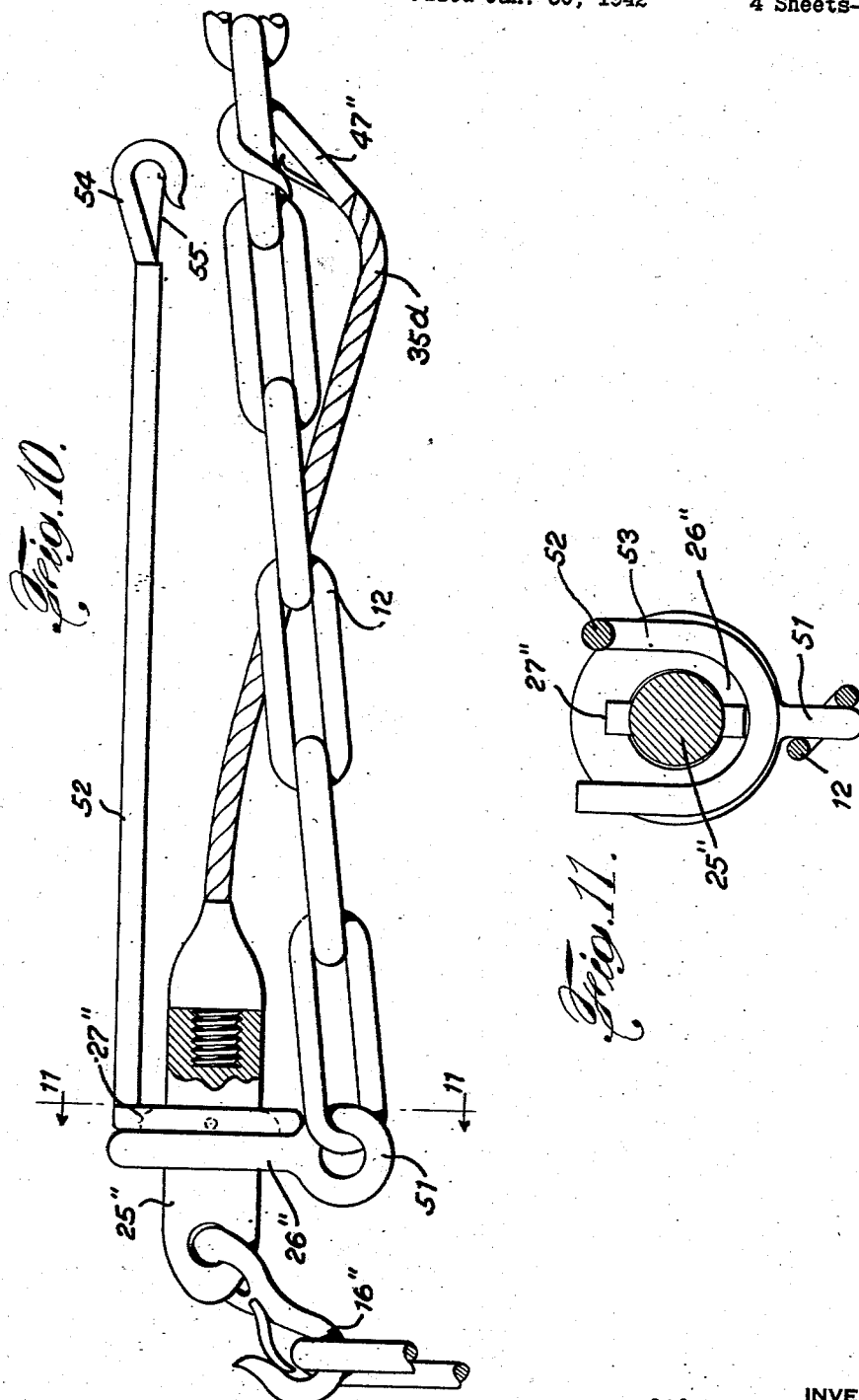

Nov. 28, 1944.  W. R. ROYER  2,363,998
TIRE CHAIN CONNECTOR
Filed Jan. 30, 1942  4 Sheets-Sheet 4
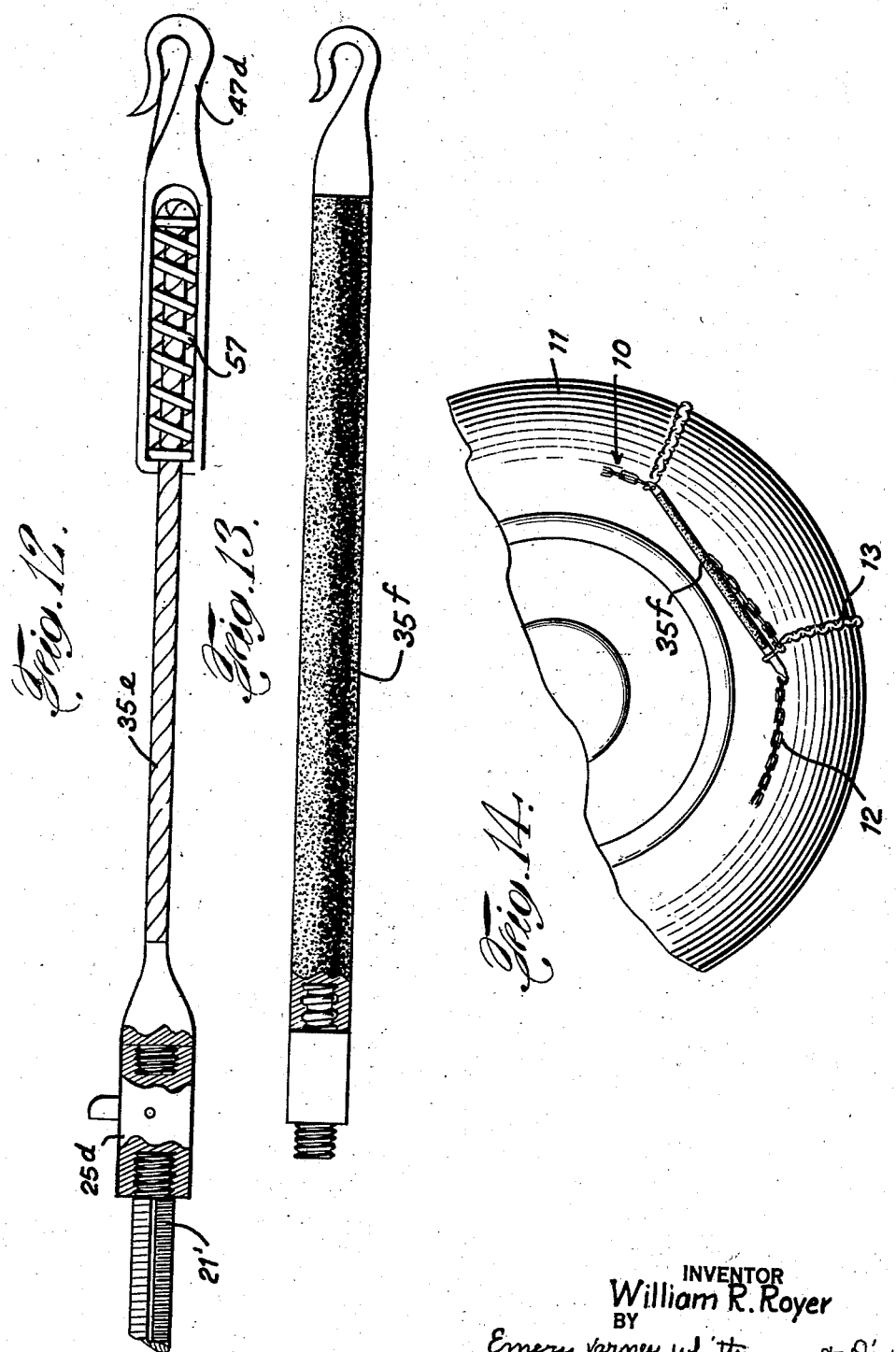
INVENTOR
William R. Royer
BY
Emery, Varney, Whittemore & Dix
ATTORNEYS Patented Nov. 28, 1944

2,363,998

UNITED STATES PATENT OFFICE 2,363,998

TIRE CHAIN CONNECTOR

William R. Royer, Wilkes-Barre, Pa.

Application January 30, 1942, Serial No. 428,811

8 Claims. (Cl. 152—213)

This invention relates to tire chains and connectors, and has for an object the provision of improvements in this art.

The present invention is, in certain respects, an improvement upon the chain connector disclosed in my co-pending application Serial No. 383,471, filed March 15, 1941, and has among its various objects the provision of a connector which includes a light flexible elongated element which will facilitate the connection of a side chain, especially the rear side chain which, on modern cars, is relatively inaccessible, and which may thereafter be disposed of in a convenient manner.

Another object is to provide a connector which will permit the elimination of loose links at the ends of the side chain and provide parts which can be readily located and manipulated to avoid the entanglements which characterize the present handling of chains.

Another object is to provide ready adjustment in effective length of the side chains as an improved substitute for the extra loose links which were previously provided.

Another object is to provide for easy addition of a cross chain at the connected ends whereby the chain assembly may be readily applied without raising the wheel, and the added cross chain applied, when desired, after the car has been moved a short distance to bring the connected ends away from the ground.

Another object is to provide a connector which may readily be applied to existing chains.

The above and other objects, advantages and features of novelty will be apparent from the following description of certain exemplary embodiments of the invention, reference being made to the accompanying drawings, wherein:

Fig. 1 is a side view of the connector applied to a side chain;

Fig. 2 is an enlarged side view of the connector alone;

Fig. 3 is a similar side view, partly in section, of the connector with some of the parts separated;

Fig. 4 is a cross-sectional view taken on the line 4—4 of Fig. 3;

Fig. 5 is a cross-sectional view taken on the line 5—5 of Fig. 3;

Fig. 6 is a cross-sectional view taken on the line 6—6 of Fig. 2;

Fig. 7 is a side elevation of a modified form of male member for use with the female member of Figs. 2 to 6;

Fig. 8 is a side elevation of a modified form of female member for use with the male member of Figs. 2 to 7;

Fig. 9 is a side view of a modified form of connector;

Fig. 10 is a side view of a modified form of connector and a pusher which may be used therewith;

Fig. 11 is a section on the line 11—11 of Fig. 10;

Fig. 12 is a side view of a modification of the male member shown in Fig. 10;

Fig. 13 is a side view of another modification of the male member shown in Fig. 10; and Fig. 14 is a side view of a chain assembly on a tire showing the device of Figs. 10 or 13 as applied.

Referring to Fig. 1, a wrap-around chain 10 is shown in operating position upon a tire 11. The chain comprises side chains 12, cross chains 13 and connectors 14 for the side chains. The present invention is concerned with these connectors, and one form is shown in Figs. 2 to 6.

The connector 14 comprises telescopic latch coupling members 17 and 18 which are respectively connected to the two ends of a side chain 12, preferably by safety latch hooks 16 and 19 respectively which permit detachment of one or both members for adjustment or for easy installation or removal. It will be noticed that the connector takes the place of the conventional connectors if they should have been provided as original equipment on a chain, and that the loose ends beyond the terminal cross chains 13 have also been removed. They are simply omitted if the present connector is supplied as original equipment. This form of connector is as long as the space between terminal cross chains and avoids the tangling and searching for loose ends which was involved with the usual chains.

One of the coupling members may be provided with an anchorage such as a loop 20 to which a supplemental cross chain 13x may be attached, preferably so as to be readily connected and disconnected.

One of the coupling members may be of considerable length and provide adjustment as by a threaded connection including the inner threaded rod 21 and the outer threaded socket 22. For locking the rod and socket in adjusted positions the rod may be provided with a spline groove 23 and the socket with a spring detent 24.

The coupling member 17 includes a tapered plug 25 adapted to enter a ring or shroud 26 of the female coupling member 18 and a spring latch 27 adapted to catch behind the ring when the parts are drawn together. Two or more inclined bars 28 connect the shroud ring to the central part or shank 29 of the coupling member.

The coupling members as thus far described may be easily pushed together by hand on the front side chain but are difficult to reach on the rear side chain. To facilitate the connection of the rear side chain, and the front side chain also if desired, a flexible pull-up member 35 is provided. This is of sufficient length to reach across the tire near the ground so as to be accessible to the hands without requiring reaching behind the tire. The flexible member may be thrown around behind the tire or may be sufficiently stiff to be pushed around so that one end may be grasped by one hand while the other end is held by the other hand. Both wires and ropes in stranded form are available which are flexible but semi-rigid so as to be satisfactory for this purpose and which also have considerable strength in small sizes.

The flexible member 35 forms a guide along the longitudinal axis for directing the coupling members together. It is shown to be connected to the coupling members for the coupling operation and be completely separable so as to be removed from the chain assembly after the coupling operation has been completed, the part 25 of the male coupling member being provided with a guide passage 38, and the part 29 of the female coupling member being provided with a guide passage 39 through which the flexible member 35 is threaded. For convenience in threading and to provide a later disposition of the end of the flexible member for the pull-up, the passages are curved at their distant ends, as at 40 and 41 respectively, to open through the sides of the parts. The parts, as thus disposed, may be pulled up by one hand.

A stop 42 may be provided at one end of the flexible member to keep it from going completely through the passage. Here it is in the form of a ring which can readily be grasped to pull the flexible member out after the coupling members have been connected. The ring also assists in preventing loss of the flexible member, which may be wound up on it. The entire flexible member with its ring is very small and may be carried in the dash compartment of a car or even in a vest pocket where it will be readily accessible. This avoids the necessity of keeping the chain attaching tool in the compartment with the larger car tools where it is not so readily accessible.

Fig. 7 shows a modification of the male coupling member which may be used when no longitudinal adjustment in length is wanted. Here the plug 25' carries the safety hook 16' and the latch 27' and is provided with the longitudinal passage 38'.

In applying a chain with this connector, the chain is first saddled on the top of the tire. The male coupling member is brought out and the end of the flexible member threaded through it. Or this may be done before the chain is saddled on the tire. The free end of the flexible member is passed around behind the tire with one hand and picked up by the other hand. It is then threaded through the other coupling member. The free end of the flexible member may now be pulled out laterally toward the front side of the tire to couple the parts. If desired, the female member may be pushed up by one hand while the end of the flexible member is held by the other hand.

After the parts have been coupled, the flexible member may be removed by pulling the ring 42. It may be desirable to move the car up somewhat to make this more accessible.

A modified form of connector is shown in Fig. 8. Here the flexible member 35' passes over a grooved pulley 45 and somewhat reversely out through the pulley housing 46 provided on the female coupling member 18'. The flexible member may be provided with a safety hook 47 for attaching it after the parts have been pulled up and to give it weight as an aid in throwing it around behind the tire. The hook is small enough to pass readily through the ring or shroud 26' and the passage in the housing 46.

The front edge 48 of the housing is disposed ahead of the rear portion of the pulley 45 so as to have a snubbing action on the flexible member when pulled back against it or around it, as shown.

Fig. 9 shows a further modification. Here the flexible member 35" is directly attached at one end to one end of the side chain 12, as by an eye 50, a hook or the like, and is passed through a housing 46' over a pulley 45', as in the Fig. 8 form. The hook 47' secures the end of the flexible member to the side chain. The flexible member itself serves as the connector in this case. It may be provided with a loop 20', for the attachment of an auxiliary cross chain.

In Fig. 10 there is shown a modification in which the male plug element 25" which carries latch keepers 27" is provided with a safety hook 16" for close coupling, as in Fig. 7, and with a thread-connected flexible member 35d. The flexible member may be provided with a safety hook 47" for securing it to a side chain 12, either in use, as shown, or when stored in the car. The female member may comprise a simple ring 26" provided with an eye 51 by which it is attached to the side chain 12. The hook 16" serves as a stop when the ring is pushed up.

The ring 26" may be pushed up into position by a rod 52 which is provided at its end with a U-shaped portion 53 for embracing the elongated flexible member and plug 25", as shown in Fig. 11, for guidance. The pusher may be formed simply by bending straight rod stock, the outer end forming a hook 54. A spring safety keeper 55 may be added to the hook, as by riveting or soldering. The hook provides means for attaching the pusher to one of the chain assemblies to avoid loss or misplacement when stored in the car. The U-shaped end permits the pusher to be readily associated with or removed from the elongated guide element without having to pass completely over the end as it would if it were closed upon itself. The threaded connection between the flexible element 35d and the plug 25" need not be screwed up very tight. If it is left somewhat loose it serves its purpose and then permits the flexible element to be unscrewed from the outer end without much twisting strain on the flexible portion.

The hook 16" in Fig. 10 is shown to be flexibly connected to the plug 25" but it may be rigidly connected, after the manner of Fig. 3, and may also be adjustable, as in that form. This is indicated in Fig. 12, where the threaded rod 21' is shown to be entered into a threaded socket of the plug 25d. Here also resilient means, such as a confined spring 51, is provided in the flexible element 35e. The resilient means permits the flexible member to be stretched and attached in a secure manner, even if a plain hook 47d is used instead of a safety hook. It also permits the resilient flexible element to be used as a stretcher to assist in applying the chain and in keeping the side chains tight.

In Fig. 13 a resilient flexible element 35f of the elastic type is shown, the intermediate portion being made, for example, of rubber or the like. Depending on size, character and cure, the rubber element may be of varying flexibility or rigidity and of varying stretchability or resistance, to suit various requirements. Here, again, it may act as a stretcher, as shown in Fig. 14.

In all of these forms where the elongated element is attached at its end to a side chain, it acts as an additional safety factor relative to the coupling which it serves. And, of course, the flexible element can be doubled back from its threaded point and secured upon itself or to a part associated with the other end of the side chain to form a stronger connection. In fact, this connection alone may be adequate for an emergency.

In all forms it will be noted that the auxiliary flexible guiding element is sufficiently long beyond the length of the connected points of the side chain in pulled-up position to reach from one side of the tire to the other from hand to hand when the tire is resting on the ground, whereby to avoid reaching the hand behind the tire in associating the two ends of the side chain to make the connection. In Fig. 14, the extended end of the side chain 12 at the left gives free length (shown attached to the left end of the flexible element 35f) beyond the last cross chain on that side for facilitating the transfer of the elongated flexible element around behind the tire. The right end of the side chain may be foreshortened to stop at the last cross chain 13, as shown. Preferably, the permanent cross chains do not come at the supported portion of the tire when it rests on the ground at the connective portion for making the connection.

While various features have been shown in different embodiments, it will be understood, without further illustration or explanation, that they may be interchanged so far as applicable and desirable. Also, while certain embodiments have been specifically described, it is to be understood that the invention may have various other embodiments within the limits of the prior art and the scope of the subjoined claims.

1. A connector adapted to bring spaced parts as of the ends of a tire chain together and couple them, comprising in combination, two mating coupling members slidable longitudinally along each other to make connection in drawn-up position, means connecting said members to opposed parts to be connected as to opposite ends of a tire side chain respectively, and a flexible extension having one end secured to one of the coupling members behind the coupling element thereof and passing over a part on the other coupling member beyond the coupling element thereof but disposed in the line of the axis of said coupling members in which said coupling members move in converging to make their connection, to provide relative converging movement and to serve as an aid in bringing said members together in proper alignment for connection.

2. A connector adapted to bring spaced parts as of the ends of a tire chain together and couple them, comprising in combination, two mating coupling members slidable longitudinally along each other to make connection in drawn-up position, and elongated means for guiding said members together, said means including a flexible member secured to one coupling member behind the coupling element thereof and threaded in a passage in the other coupling member, which passage is located beyond the coupling element thereof but aligned with the axis of said members along which they are moved together in making their connection.

3. A connector as set forth in claim 2 further characterized by the fact that said flexible member is detachable from both of said coupling members but is connected to one of them prior to making the connection and is threaded through a part on the second coupling member in preparing to make the connection.

4. A connector adapted to bring spaced parts as of the ends of a tire chain together and couple them, comprising in combination, two mating coupling members slidable longitudinally along each other to make connection in drawn-up position, and elongated means for guiding said members together, said means including a flexible member disposed along the axis of said members along which they are moved together in making their connection, said flexible member being connected to one of said coupling members but not to the other prior to making the connection and being threaded through a part on the second coupling member beyond the coupling element thereof but in the line of movement along the axis of said members leading to the connecting position, and said flexible member being bent laterally in its guide at one of said coupling members to form a pull element for drawing the coupling elements together.

5. A connector adapted to bring spaced parts as of the ends of a tire chain together and couple them, comprising in combination, two mating telescopic latch coupling members slidable longitudinally along each other to make connection in drawn-up position, means connecting said members to opposite ends of a side chain respectively, a flexible member connected to one of said coupling members through a longitudinal passage therein in the line of telescopic movement leading to the connecting position, the second coupling member having a passage for the flexible member, said passage turning laterally to permit the flexible member to be pulled out laterally, whereby to form a pull element for drawing the coupling members together.

6. A connector adapted to bring spaced parts as of the ends of a tire chain together and couple them, comprising in combination, two mating telescopic latch coupling members slidable longitudinally along each other to make the connection in drawn-up position, means connecting said members to opposite ends of a side chain respectively, one of said connecting means being adjustable in length and including a locking element for maintaining a given adjusted position, and auxiliary means for bringing said latch coupling members together in making the connection, said auxiliary means including a flexible member connected to one of said coupling members through a longitudinal passage therein in the line of telescopic movement leading to the connecting position, the second coupling member having a passage for the flexible member, said passage turning laterally to permit the flexible member to be pulled out laterally, whereby to form a pull element for drawing the coupling members together.

7. A connector adapted to bring spaced parts as of the ends of a tire chain together and couple them, comprising in combination, two mating telescopic latch coupling members slidable longitudinally along each other to make the connection in drawn-up position, means connecting said members to opposite ends of a side chain respectively, one of said connecting means being adjustable in length and including mating screw threaded parts, one of which is splined, and a locking element cooperating with the splined part for maintaining a given adjusted position, and auxiliary means for bringing said latch coupling parts together in making the connection, said auxiliary means including a flexible member connected to one of said coupling members through a longitudinal passage therein in the line of telescopic movement leading to the connecting position, the second coupling member having a passage for the flexible member, said passage turning laterally to permit the flexible member to be pulled out laterally whereby to form a pull element for drawing the coupling members together.

8. A connector adapted to bring spaced parts as of the ends of a tire chain together and couple them, comprising in combination, two mating telescopic latch coupling members slidable longitudinally along each other to make a connection in drawn-up position, snap hooks connecting said members to opposite ends of a side chain respectively at the junction with a cross chain, one of said connecting means including elements threaded together to provide longitudinal adjustment, the inner threaded member being splined and the outer threaded member being provided with a locking detent fitting in said spline for locking the parts in adjusted positions, said members being provided with longitudinal guides opening on the sides at distant ends, and a flexible connection-making member adapted to pass through said guides and pull up the members into latching position.

WILLIAM R. ROYER.